United States Patent [19]

Vlnaty et al.

[11] Patent Number: 5,030,267
[45] Date of Patent: Jul. 9, 1991

[54] METHOD OF PREPARING CONTROLLED RELEASE FERTILIZERS AND PRODUCTS THEREOF

[75] Inventors: Joseph Vlnaty, St. Petersburg Beach; Mark C. Elizer, St. Petersburg, both of Fla.

[73] Assignee: Nutrihold Inc., Columbia, Tenn.

[21] Appl. No.: 270,683

[22] Filed: Nov. 14, 1988

[51] Int. Cl.⁵ .................... A01N 25/00; C05G 5/00; C05B 7/00
[52] U.S. Cl. ..................... 71/64.11; 71/28; 71/34; 71/64.13; 428/404
[58] Field of Search .......... 71/31, 61, 62, 28, 24, 71/904, 64.07, 64.09, 64.11, 64.13; 106/74, 85, 97; 428/320.2, 404

[56] References Cited

U.S. PATENT DOCUMENTS

| | | | |
|---|---|---|---|
| T951,006 | 10/1976 | Getsinger | 71/28 |
| 3,630,713 | 12/1971 | Adams et al. | 71/63 |
| 4,023,955 | 5/1977 | Mueller | 427/214 |
| 4,042,366 | 8/1977 | Fersch et al. | 71/29 |
| 4,082,533 | 4/1978 | Wittenbrook | 71/64.12 |
| 4,283,423 | 8/1981 | Watkins et al. | 71/29 |
| 4,369,055 | 1/1983 | Fujita et al. | 71/64.11 |
| 4,486,217 | 12/1984 | Arai et al. | 71/25 |
| 4,493,725 | 1/1985 | Moon et al. | 71/64.07 |
| 4,670,039 | 6/1987 | Sjogren | 71/34 |
| 4,885,021 | 12/1989 | Elrod | 71/28 |

FOREIGN PATENT DOCUMENTS 1250557 8/1986 U.S.S.R. .................... 71/29

OTHER PUBLICATIONS

Dialog Abstract, "DE 2230685" Slow Release Fertilizer Prodn.—From Humus Contg. Mat'l., Silic. Hydrosol . . . Nutrients, 1/17/71–date.
Dialog Abstract JP 46003088 "Slowly Soluble Fertilizer Granules for Rice Plants" Jan. 26, 1971, Showa.

Primary Examiner—William R. Dixon, Jr.
Assistant Examiner—Paul Marcantoni
Attorney, Agent, or Firm—Armstrong, Nikaido, Marmelstein, Kubovcik & Murray

[57] ABSTRACT

Controlled release fertilizers containing water-soluble nutrients such as potassium nitrate which are easily leached from the fertilizer by moisture in the soil have a coating which more efficiently retards the release of the nutrients and also provides citric acid soluble silicon to the soil. Nutrient particles are first coated wtih a colloid formed by the acidification of preconditioned calcium metasilicate with citric acid and then mixed with cement. The calcium metasilicate is preconditioned by heating to a temperature of at least 1300° C. to sinter at least a portion of the silicate. The nutrient particles are then pelletized and cured to form a silica gel matrix containing acicular calcium metasilicate and a cement coating on the pellets. The nutrient pellets may be mixed with cement coated urea prills in a silica gel formed by the acidification of preconditioned calcium metasilicate with nitric acid to further retard the release of nutrients, and to provide additional citric acid soluble silicon as well as nitrogen to the fertilizer. In addition a phosphorus source such as a municipal sludge may be added to the silica gel.

23 Claims, 1 Drawing Sheet

METHOD OF PREPARING CONTROLLED RELEASE FERTILIZERS AND PRODUCTS THEREOF

BACKGROUND OF THE INVENTION

This invention relates to a method of preparing controlled release fertilizers containing water soluble nutrients which are easily leached from the fertilizers by moisture in the soil. It is particularly useful for developing a coating on the fertilizers for retarding the release of nutrients such as potassium and nitrogen which are present in the type of fertilizers containing coated soluble potassium salts and urea. The premature loss of such nutrients through leaching undesirably results in needlessly high application rates of fertilizer with consequent unnecessary pollution of ground waters.

The release of nutrients such as water soluble potassium salts and nitrogen has generally been controlled by coating potassium-containing pellets, urea prills and the like with cement. See, e.g., U.S. Pat. Nos. 3,630,713; 3,647,416; 4,023,955 and 4,486,217. U.S. Pat. No. 4,486,217 discloses other fertilizer compositions admixed with a phosphate or silicophosphate gel-sol mixture. U.S. Pat. No. 4,082,533 discloses other more expensive fertilizers which are sulfur coated or plastic coated.

Although the prior art coatings have been generally effective in retarding the release of nutrients, the art has been continually seeking ever more effective and economical coatings.

SUMMARY OF THE INVENTION

The practice of the present invention provides fertilizers comprising coated water soluble nutrients which more slowly release the nutrients to the soil than do comparable prior art coated fertilizers. According to the present invention, nutrients such as water soluble potassium salts and the like are coated with a layer of a silicic acid colloid containing a calcium salt. The silicic acid is prepared by acidifying calcium metasilicate with, preferably, citric acid or, alternatively, with boric acid. Preferably, the calcium metasilicate is preconditioned to increase its silicon solubility for facilitating the formation of the silicic acid and the eventual uptake of silicon by the crops. In this preliminary preconditioning step, a calcium metasilicate source material is heated to a temperature sufficient to at least partially sinter the calcium metasilicate. Preferably the material is heated to a high enough temperature to form a glass.

The nutrient particles are then mixed with a hydraulic cement containing tricalcium silicate to form a mixture. The mixture is then pelletized, preferably, with water to form green or uncured pellets. Preferably small particles are embedded in the surface of the pellets to retard clustering in a subsequent curing step. Most preferably the embedded particles are cured hydraulic cement fines or filler particles such as fly ash coated with cured cement to most effectively retard clustering. The pellets are then cured to form a silica gel matrix containing acicular calcium metasilicate crystals around the nutrient particles and to hydrate the cement disposed over the matrix. The calcium metasilicate in the matrix is formed by the reaction of the tricalcium silicate from the cement with the silicic acid from the colloid. In a preferred practice the crystallization of calcium metasilicate is effectively nucleated by acicular calcium citrate needles in the silicic acid for producing a dense matrix. Preferably a substantially nonporous cement coating is formed by the pozzolanic reaction of the cement particles with the silicic acid and moisture in the atmosphere around the pellets.

In a further practice of the invention, the pellets are mixed with a nitrogen-containing component such as cement coated urea prills in a silica gel formed by acidifying calcium metasilicate with a mineral acid. Preferably, the mineral acid is nitric acid and the calcium metasilicate is preconditioned for providing additional citric acid soluble silicon and calcium nitrate nutrients in the silica gel. The pellets and prills mixed in the silica gel are prevented from segregating from each other during processing, storage and application. In addition, nitrogen-potassium-phosphorus type fertilizers are produced by mixing a source of phosphorus such as industrial by-products or municipal wastes with the silica gel.

Other details, objects and advantages of the invention will become apparent as the following description proceeds.

DESCRIPTION OF THE PREFERRED EMBODIMENTS

In the preferred practice of the invention, calcium metasilicate is preconditioned to enhance its available soluble silicon content by heating to a sufficiently high temperature to at least lightly sinter the material. Thus, a naturally occurring form of calcium metasilicate such as wollastonite is heated to temperatures of up to about 1300° C. to about 1500° C. Similarly a preconditioned synthetic form of calcium metasilicate may be prepared by mixing a calcium oxide source material such as calcite or limestone with a silicon dioxide source material such as silica and then heating the mixture up to a temperature of about 1300° C. to about 1500° C. The available silicon content of preconditioned calcium metasilicate is thereby increased from about 8.8 wt. % "citric acid soluble" silicon in naturally occurring wollastonite up to about 18 wt. % by heating the wollastonite at 1300° C. for 30 minutes. The amount of citric acid soluble silica is further increased up to 24 wt. % by heating the wollastonite up to 1500° C. for 30 minutes to form a glass. The citric acid solubility values are determined by pulverizing the silicate to minus 200 mesh and then reacting 0.2 grams of fines with 100 milliliters of 2% citric acid solution for 60 minutes at room temperature. The acid suspension is filtered and the dissolved silica concentration of the filtrate is determined by an inductively coupled plasma method.

Preferably, synthetic calcium metasilicate is prepared from a mixture of a calcium oxide source and a silicon dioxide source having a 1:1 molar ratio. Excessive amounts of silica results in insoluble tridymit in the calcium metasilicate and excess amounts of calcite or limestone results in unreacted lime which reacts with acids and dilutes the yield.

The calcium metasilicate is pulverized to a nominal particle size of minus 50 mesh and mixed with a citric acid or boric acid solution in a molar ratio of about 1 silicate/2 acid in a ball mill to form a silicic acid colloid containing insoluble calcium salt crystals. Citric acid is preferable because it is hypothesized that the relatively large acicular calcium citrate crystals most effectively nucleate the crystallization of acicular calcium metasilicate during the curing step and that the presence of two needle like species more effectively penetrate the pores and voids of the silica gel which forms during the curing step to provide a more impervious barrier to the diffusion of water and nutrients.

The silicic acid colloid is introduced into a rotary driven mixer containing a water soluble potassium salt such as potassium chloride, potassium nitrate or potassium sulfate to form a colloidal layer on the salt particles. A total mixture comprising as little as ½ percent silicic acid colloid by weight is sufficient to form a suitable thin layer on the salt particles.

Figure 1:
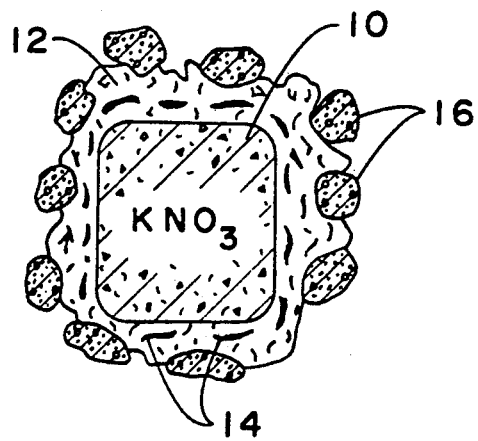
FIG. 1 illustrates a water soluble nutrient-containing particle coated in accordance with preferred practices of the present invention before the curing step.

The coated salt particles are then mixed in a blade mixer with particles of hydraulic cement containing tricalcium silicate such as a Portland cement and the like in accordance with conventional cement coating practices. The cement may contain up to about 70 percent of filler materials such as fly ash or the like. Other known additives such as humic acid may also be introduced into the mixer. Referring to FIG. 1, particles processed in accordance with the foregoing preferred practice of the present invention are hypothesized to contain a water soluble nutrient-containing crystal 10 at its center with a silicic acid colloid layer 12 containing acicular calcium citrate crystals 14 and cement grains 16 surrounding the nutrient-containing crystal 10. The mixture of particles is then pelletized with water on a pelletization disc such as that shown by U.S. Pat. No. 3,630,713. Pellets having a nominal size of two to ten millimeters are formed with about 14 percent water.

The green pellets may be then mixed with cured cement or filler materials such as fly ash, silica and the like having a nominal particle size of one millimeter on a belt to embed the materials in the colloid or on the uncured cement particles. Preferably the filler materials are coated with cured cement for retarding the tendency of the green particles to cluster during the curing step. Uncoated filler materials may enter into the pozzolanic reaction and thereby cause clustering. Recycled fines comprising cement and cement coated fillers screened from the cured pellets may be advantageously used as the embedding material.

The green pellets are then cured in a silo or other protected environment to form a silica gel matrix containing acicular calcium metasilicate and a hydrated cement coating. The matrix also contains calcium citrate needles or other salt from the colloid and residual cement particles. Preferably the humidity of the atmosphere in the silo is as high as practicable to facilitate the exothermic pozzolanic reaction. The reaction will maintain the temperature of the pellets in a 100 percent humid atmosphere at about 100° F., which will essentially cure the coating in about 36 hours. The curing time is reduced to 24 hours by raising the temperature to 180° F. The pellets may be removed from the silo in lesser times where it is desired to only partially cure the coating. The pellets are then screened to separate fines, which may be recycled to the pelletization disc.

Figure 2:
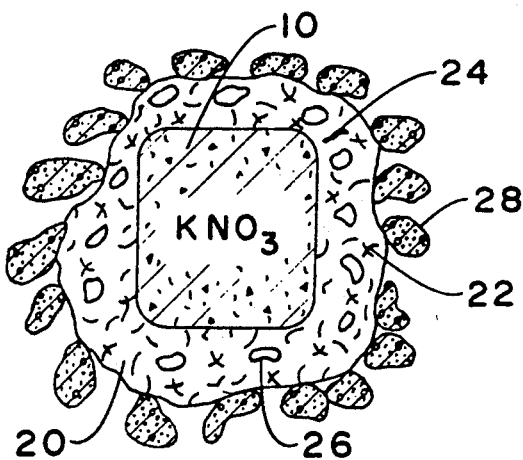
FIG. 2 illustrates a water soluble nutrient-containing particle coated in accordance with a preferred practice of the present invention after the curing step.

Pellets made in accordance with the above-described practices have a silica gel matrix and cement coating surrounding the water soluble nutrient particles. The particles are hypothesized to have the structure shown in FIG. 2. The water soluble nutrient crystals 10 at the center are coated with a dense silica gel matrix 20 containing calcium metasilicate crystals 22 and calcium citrate crystals 24 or other insoluble salt as well as residual cement particles 26. A more porous layer of hydrated cement particles 28 is disposed around the outer surface of the silica gel matrix. The gel contains acicular calcium metasilicate crystals and, in the preferred practice, calcium citrate crystals which penetrate the pores and voids of the gel and the cement to provide a dense diffusion barrier to the moisture and the nutrients.

Figure 3:
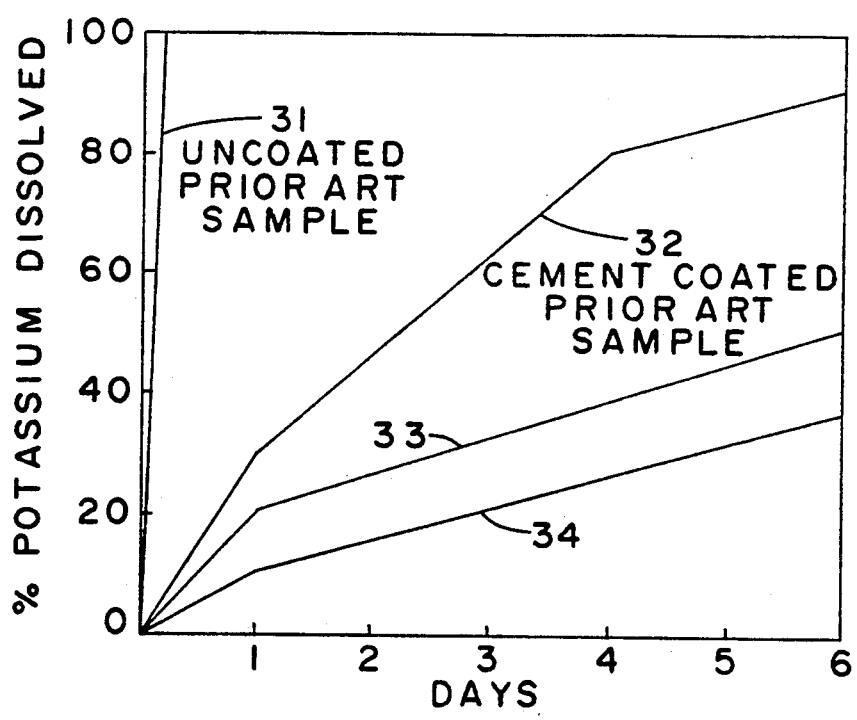
FIG. 3 is a graph comparing the release of water soluble nutrients from pellets embodying the present invention with prior art pellets.

The attached graph (FIG. 3) demonstrates the enhanced ability of pellets comprising water soluble nutrients coated in accordance with the practices of the present invention to control the release of the water soluble component. The graph specifically shows the percent of potassium which dissolved from samples of potassium nitrate as a function of time. In each test, 10 grams of sample were placed in 250 milliliters of water and the potassium solubilities were measured by a potassium ion electrode. Curve 31 shows that an uncoated sample of potassium nitrate dissolved in less than a day. Curve 32 shows that about 90 percent of the potassium dissolved in six days from pellet samples coated with cement in accordance with the prior art. Curve 33 shows that only about 50 percent of the potassium dissolved in six days from pellet samples coated in accordance with the practices of the present invention. Curve 34 shows that less than 40 percent of the potassium dissolved from pellet samples coated in accordance with the practices of the present invention, including a silica gel applied overcoat on the pellets.

Pellets embodying the invention are made in accordance with the above-described practices from the following typical recipes (in weight percent):

| Pellet Composition | 1 | 2 | 3 | 4 | 5 | 6 |
|---|---|---|---|---|---|---|
| KNO$_3$ | 50 | 50 | 50 |  | 50 | 50 |
| KCl |  |  |  | 50 |  |  |
| CaO · SiO$_2$ | 30 | 30 | 28 | 30 | 10 | 1 |
| Citric Acid |  |  | 1 | 1 | 1 | 1 |
| Boric Acid | 1 | 1 |  |  |  |  |
| Sorel Cement |  | 1 |  |  |  |  |
| Dolomite |  |  | 1 |  |  |  |
| Ca$_3$(PO$_4$)$_2$ |  |  | 5 |  |  |  |
| Cement | 19 | 18 | 15 | 19 | 15 | 20 |
| Ash |  |  |  |  | 24 | 23 |
| Humic Acid |  |  |  |  |  | 5 |

Useful fertilizers comprising the pellets made in accordance with the present invention may also contain a source of nitrogen such as urea prills which are conventionally coated with cement to control the release of nitrogen.

In the practice of the present invention, the pellets and cement coated urea prills are mixed together in a continuous paddle mixer with a silica gel produced by acidifying preconditioned calcium metasilicate with a mineral acid such as nitric acid, hydrochloric acid or sulfuric acid. Preferably the mineral acid is nitric acid and the excess acid is neutralized with dolomite so that the gel contains calcium nitrates and magnesium nitrate as well as additional citric acid soluble silicon to obtain the benefit of their nutrient values. The acidified calcium metasilicate is concentrated in a thickener and then introduced into the mixer as a gel. Phosphoric acid is not a suitable acidifying agent because excessive amounts of water are liberated by the reaction of urea with the phosphate radical which prematurely leaches nitrogen from the urea and dilutes the silica gel. The fertilizers may be cured by aging at room temperature or directly bagged for use.

Nitrogen-phosphorus-potassium type fertilizers may be produced by mixing a suitable phosphorus containing source material into the silica gel along with the pellets and prills. Advantageously, normally unwanted substances such as municipal wastes and sludges and industrial by-products which are normally acceptable sources of phosphorus for fertilizers are suitable sources. In addition, other components such as slags, ashes, additional micronutrients, pesticides and the like may also be added to the silica gel in customized fertilizer compositions to provide both the desired nutrient values and also a desired residue in the soil comprising fragments from the pellets and silica gel and mineral matter.

Controlled release fertilizers made in accordance with the foregoing practices comprising coated pellets and coated urea prills gelled in silica have been spread on sugar cane, rice and other crops in Florida. In a field test wherein 50 tons of fertilizer were applied to a 100 acre sugar cane field, the fertilizers produced a superior yield compared with an adjacent field fertilized with a prior art fertilizer mixture. In addition to providing controlled release of water soluble nutrients such as potassium and the like, the fertilizer resulted in high silicon uptake by sugar cane and rice growing in organic solid which was due to the citric acid soluble calcium metasilicate in the gel coatings.

Fertilizers are made in accordance with the above-described practices from the following typical recipes (in weight percent):

| Fertilizer Composition | 1 | 2 | 3 | 4 | 5 | 6 |
|---|---|---|---|---|---|---|
| KCl pellets | 75 | 75 | 50 | | | 75 |
| KCl pellets | | | | 50 | | |
| K$_2$SO$_4$ pellets | | | | | 60 | |
| urea | 12 | 12 | 20 | | 15 | 10 |
| calcium metasilicate | 7 | | 20 | 20 | | |
| starch, gelatinized | 0.5 | | | | | |
| water | 5.5 | 5.5 | | | | |
| gypsum-by product | | 7 | | | | |
| dolomite | | | 2 | | | |
| silica gel | | | 8 | 10 | 10 | 10 |
| municipal sludge | | | | 20 | | |
| ash | | | | | 10 | |
| acrylamide copolymer-sol | | 0.5 | | | | |
| micronutrients | | | | | 3 | |
| pesticides | | | | | 2 | |
| humic acid | | | | | | 5 |

The pellets are coated and the silica gel prepared in accordance with the practices of the present invention.

While certain presently preferred practices and embodiments of the present invention have been described it is to be distinctively understood that the invention is not limited thereto but may be otherwise embodied within the scope of the following claims.

What is claimed is:

1. The method of preparing controlled release fertilizers containing water soluble nutrient-containing particles, comprising the steps of:
   providing calcium metasilicate;
   acidifying the calcium metasilicate with an acid selected from the group consisting of citric acid and boric acid to form a silicic acid colloid containing a calcium salt;
   contacting water soluble nutrient-containing particles with the colloid to form a colloid layer on the particles;
   mixing the particles having the colloid layer with a hydraulic cement containing tricalcium silicate;
   pelletizing the mixture to form green pellets; and
   curing the pellets to form a silica gel matrix containing acicular calcium metasilicate and to hydrate the cement.

2. The method of claim 1 wherein the calcium metasilicate is at least partially sintered before it is acidified.

3. The method of claim 1 wherein the calcium metasilicate is acidified with citric acid to form calcium citrate in the silicic acid.

4. The method of claim 1 wherein the water soluble nutrient-containing particles are a potassium salt selected from the group consisting of potassium chloride, potassium nitrate and potassium sulfate.

5. The method of claim 1 wherein the mixture of particles and hydraulic cement is pelletized with water.

6. The method of claim 1 comprising the additional step of embedding cured cement particles on the nutrient-containing particles before the curing step.

7. The method of claim 1 comprising the additional step of embedding a filler material coated with cement on the nutrient-containing particle before the curing step.

8. The method of claim 1 comprising the additional step of mixing the cured pellets with cement coated urea prills in a silica gel formed by the addition of a mineral acid selected from the group consisting of hydrochloric, nitric or sulfuric acid to calcium metasilicate.

9. The method of claim 8 comprising the additional step of mixing a phosphorus containing solid with the pellets and prills in the silica gel.

10. A fertilizer comprising a water soluble nutrient coated with a dense silica gel matrix containing calcium metasilicate, with a porous layer of hydrated cement particles disposed around the outer surface of the silica gel matrix, in the form of pellets, made by the method of:
    providing calcium metasilicate;
    acidifying the calcium metasilicate with an acid selected from the group consisting of citric acid and boric acid, to form a silicic acid colloid containing a calcium salt;
    contacting water soluble nutrient-containing particles with the colloid to form a colloid layer on the particles;
    mixing the particles with a hydraulic cement containing tricalcium silicate;
    pelletizing the mixture to form pellets; and
    curing the pellets to form a silica gel matrix containing calcium metasilicate and to hydrate the cement.

11. The fertilizer of claim 10 wherein the calcium metasilicate is at least partially sintered, by heating the same to temperatures of up to about 1300° C. to about 1500° C. for a period of time to at least lightly sinter said calcium metasilicate, before it is acidified.

12. The fertilizer of claim 10 wherein the calcium metasilicate is acidified with citric acid.

13. The fertilizer of claim 10 wherein the water soluble nutrient-containing particles are a potassium salt selected from the group consisting of potassium chloride, potassium nitrate and potassium sulfate.

14. The fertilizer of claim 10 wherein the cured pellets are mixed with cement coated urea prills in a silica gel formed by the addition of an acid selected from the group consisting of hydrochloric, nitric and sulfuric acid to calcium metasilicate.

15. The fertilizer of claim 14 wherein nitric acid is added to the calcium metasilicate to form the silica gel.

16. The fertilizer of claim 14 wherein a phosphorus containing solid is mixed with the silica gel containing pellets and prills.

17. The fertilizer of claim 16 wherein a phosphorus containing municipal sludge is added to the silica gel.

18. A fertilizer comprising particles of water soluble nutrients coated with a dense silica gel matrix containing acicular calcium metasilicate crystals, with a porous layer of hydrated cement particles disposed around the outer surface of the silica gel matrix.

19. The fertilizer of claim 18 wherein the silica gel matrix contains acicular calcium citrate crystals.

20. The fertilizer of claim 18 wherein the water soluble nutrients are selected from the group consisting of potassium chloride, potassium nitrate and potassium sulfate.

21. The fertilizer of claim 18 further comprising a silica gel containing urea disposed over the coated particles of water soluble nutrients.

22. The fertilizer of claim 21 wherein the silica gel over the coated particles contains a phosphorus containing solid.

23. The fertilizer of claim 22 further comprising a silica gel containing humic acid.

* * * * *